Nov. 10, 1925.
R. R. SEARLES
1,561,443
LOCKING MEANS FOR ANTIFRICTION BEARING RINGS
Filed July 23, 1923
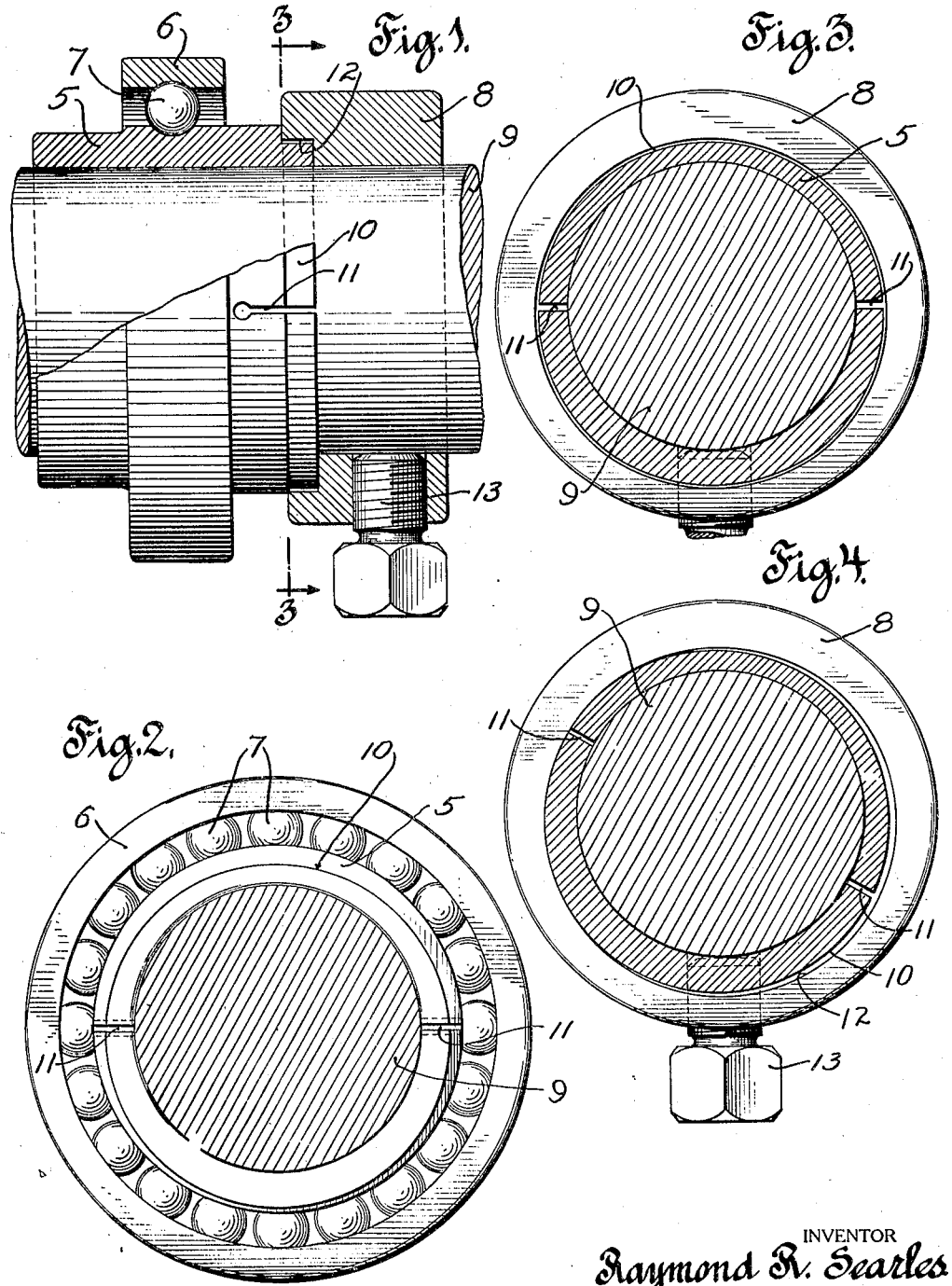
INVENTOR
Raymond R. Searles
BY
Mitchell Brothers
ATTORNEY Patented Nov. 10, 1925.

1,561,443

UNITED STATES PATENT OFFICE.

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

LOCKING MEANS FOR ANTIFRICTION BEARING RINGS.

Application filed July 28, 1923. Serial No. 654,334.

*To all whom it may concern:*

Be it known that I, RAYMOND R. SEARLES, a citizen of the United States of America, residing at New Britain, Connecticut, have invented a new and useful Locking Means for Antifriction Bearing Rings, of which the following is a specification.

My invention relates to what may be termed a self locking driving collar.

The invention is particularly adapted for locking a ball bearing or other anti-friction bearing ring to a shaft.

Heretofore much difficulty has been experienced in securely holding or locking an anti-friction bearing ring, such as the inner ring of a ball bearing, in place on a shaft when the bearing is embodied in a shaft hanger or the like. Various expedients have been resorted to, such as securing a collar on the shaft adjacent the inner bearing ring and forming co-operating lugs and notches or the like on the adjacent edges of the ring and collar. Again, tapered sleeves and wedges have been placed on the shaft and within the inner ring, so as to attempt to hold the latter against rotation on a shaft These devices and others with which I am familiar have not been altogether successful commercially, due to high cost of manufacture, assembly or maintenance, or due to the fact that they would not hold the inner ring securely, or were not applicable to many situations.

In a ball bearing it has been found that there is a persistent tendency for the inner ring to rotate upon a shaft, and this tendency is so marked that lugs or shoulders on a holding collar, as well as on the inner ring, are often sheared off or broken during the rotation of the shaft. This tendency of the inner ring to rotate may be due to one or more causes which are, perhaps, not altogether understood, since it would appear that there would be no substantial tendency for the inner ring to rotate, but rather for the balls to rotate on the inner ring. Suffice it to say, however, that there are exceedingly heavy forces developed during the operation of a bearing in a device such as a shaft hanger, and these forces do, in fact, tend to rotate the inner ring on the shaft.

It is the principal object of my invention, therefore, to combine an anti-friction bearing and a very simple, cheap form of locking means, whereby the inner ring will be securely held against rotation on the shaft, and any tendency of the ring to creep or rotate on the shaft will tend to cause the ring to be more securely locked to the shaft.

Briefly stated, in the preferred form of my invention I employ an inner ring to be secured on a shaft and an outer ring surrounding the inner ring, with anti-friction rolling members interposed between the two rings, the outer ring usually being held stationary in a suitable support. such as a shaft hanger or hanger box. A locking collar is secured on the shaft adjacent the inner ring, and one of these adjacent members is provided with an outer surface eccentric to the bore therethrough, while the other member is provided with a counterbore or an inner surface eccentric to the bore therethrough and adapted to receive the eccentric outer surface on the other member. The collar is preferably positively held to the shaft, as by means of a set screw, with the eccentric surfaces in engagement with each other. A slight relative rotation between the inner ring and the collar will cause parts of the ring and of the collar to wedge or bind upon each other and upon the shaft, so as to cause both the ring and the collar to positively rotate with the shaft.

In the drawings which show, for illustrative purposes only, a preferred embodiment of the invention, Figure 1 is a side view in partial section of a shaft having a ball bearing ring locked by means of a collar and embodying features of my invention;

Figure 2 is an end view of a ball bearing on a shaft, the locking collar being removed;

Figure 3 is a sectional view taken substantially in the plane of the line 3—3 of Figure 1;

Figure 4 is a view similar to Figure 3, but showing the locking collar and corresponding ring slightly rotated so as to lock the rings and shaft together.

In said drawings:

5 indicates a collar which in this case constitutes the inner ring or race member of a ball bearing. 6 indicates an outer bearing ring or race member which may be held or secured to any suitable part, for example a shaft hanger. Anti-friction members, such as balls 7—7, are interposed between the rings 5—6. A second collar 8 is fitted on the shaft 9 adjacent to the inner ring 5. In the preferred form shown, one end of the ring 5 is turned down so as to provide a surface 10 which is eccentric to the bore through the ring fitting on the shaft 9. If desired, the end of the ring 5 may be split as indicated at 11—11 to render the same slightly resilient. The collar 8 is provided with a counter bored portion 12 which is eccentric with the main bore through the collar and which is of a size to receive the eccentric surface 10 on the ring 5. If desired, one of the rings, in this case the collar 8, may be held to the shaft 9 as by means of the set screw 13.

The operation of the device herein described is as follows:

The two rings 5 and 8 are positioned on the shaft 9, and the eccentric portion 10 is introduced into the counter bored recess 12. Since both the parts 10 and 12 are eccentric to the bores through the respective rings, it will be seen that upon a slight relative rotation from the positions shown in Fig. 3 the rings will grip each other and both rings will grip or clutch the shaft 9. Fig. 3 shows the parts before the slight relative rotation heretofore mentioned, while Fig. 4 represents the parts after such relative rotation, and in gripped or locked position.

It will be obvious that the set screw 13 is merely a precautionary means, and the locking function will be performed irrespective of the presence of the set screw. The set screw, however, is desirable in that a lateral shifting of the collar on the shaft is prevented before the parts are locked and a more secure lock is assured when the collar is positively held on the shaft.

It will also be seen that the slots 11—11 are not necessary, though they are desirable, since a slight resiliency aids in securing the parts in locked position.

By the means heretofore described, both collars or rings will be securely held relatively to each other and to the shaft, and a creeping of one of the rings circumferentially of the shaft in either direction will cause the two to lock in tight engagement with each other and with the shaft.

While I have described by way of illustration a preferred form of the invention, I do not wish to be limited to the exact form shown, since slight changes may be made in the embodiment of the invention within the scope of the appended claims.

I claim:

1. In combination, an anti-friction bearing having inner and outer race-members and anti-friction elements therebetween, a shaft pasing through said inner race-member, and a member adapted to be secured to said shaft adjacent the inner race-member and having a flange overlying a part of said inner race-member, said flange and part having contiguous concentric surfaces which are eccentric to said shaft whereby the inner race-member is prevented from turning on said shaft.

2. In a device of the character described, an outer ring to be secured to a support, an inner ring to be secured to a shaft, anti-friction bearing members interposed between said rings, a collar to be secured to the shaft adjacent said inner ring, and means for securing said collar to a shaft, one end of said inner ring being formed with an outer surface eccentric to the bore therethrough, said collar having a counterbore in one end thereof eccentric to the bore therethrough and of a size to receive said eccentric outer surface on said inner ring, whereby when said eccentric surfaces are in engagement with each other and said collar and ring rotated relatively to each other said collar and ring will bind tightly to each other and to the shaft passing through said collar and ring.

3. In a device of the character described, an outer ring to be secured to a support, an inner ring to be secured on a shaft, anti-friction bearing members between said two rings, a collar to be secured on a shaft adjacent said inner ring, one of said adjacent members having an outer surface eccentric to the bore therethrough, the other of said members having an internal surface to engage the outer surface on the other member and being eccentric to the bore therethrough, and means for securing one of said adjacent members to the shaft, whereby when said eccentric surfaces are in engagement with each other and the members having said surfaces are rotated relatively to each other said members will bind tightly to each other and to the shaft passing therethrough.

RAYMOND R. SEARLES.